(12) United States Patent
Harris et al.

(10) Patent No.: US 8,182,848 B2
(45) Date of Patent: *May 22, 2012

(54) METHODS FOR IMPROVING THE STORAGE AND HANDLING CHARACTERISTICS OF CONDENSED WHEY PERMEATE AND FOR UTILIZING CONDENSED WHEY PERMEATE IN THE FEEDING OF A RUMINANT ANIMAL

(75) Inventors: Joseph M. Harris, Montgomery, TX (US); Paul Mostyn, Magnolia, TX (US)

(73) Assignee: Westway Feed Products, Inc., New Orleans, LA (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/427,936

(22) Filed: Apr. 22, 2009

(65) Prior Publication Data

US 2009/0263538 A1    Oct. 22, 2009

Related U.S. Application Data

(63) Continuation-in-part of application No. 11/367,064, filed on Mar. 3, 2006, now Pat. No. 7,927,641.

(51) Int. Cl.
*A23K 1/18* (2006.01)
*A23C 21/00* (2006.01)

(52) U.S. Cl. .......... 426/2; 426/330.2; 426/583; 426/657

(58) Field of Classification Search .............. 426/2, 330, 426/330.2, 580, 583, 656, 657
See application file for complete search history.

(56) References Cited

U.S. PATENT DOCUMENTS

| 4,088,791 | A |   | 5/1978 | Jones |
|---|---|---|---|---|
| 4,342,604 | A | * | 8/1982 | Evans et al. ..................... 127/31 |
| 5,656,309 | A |   | 8/1997 | Sawhill |
| 6,905,716 | B2 |   | 6/2005 | Selmer-Olsen |
| 7,927,641 | B2 | * | 4/2011 | Harris et al. ............... 426/330.2 |
| 2004/0033289 | A1 |   | 2/2004 | Selmer-Olsen |

* cited by examiner

*Primary Examiner* — Leslie Wong
(74) *Attorney, Agent, or Firm* — Booth Albanesi Schroeder LLC; Todd E. Albanesi

(57) ABSTRACT

A method of improving the storage and handling characteristics of a condensed whey permeate ("CWP") comprising the steps of: (a) obtaining a CWP that: (i) has a total solids content in the range of about 20% to about 75% by weight and has a water content in the range of about 80% to about 25% by weight; (ii) has a lactose concentration of at least 70% by weight of the total solids content; and (iii) is at a pH of less than 8; and (b) treating the CWP with at least a sufficient proportion of alkali to raise the pH to at least 8. Also, a method comprising the steps of: (a) obtaining a CWP that does not exhibit substantial crystallization; and (b) treating the CWP with at least a sufficient proportion of alkali to reduce the amount of crystallization obtained using a 30 mesh screen for a sample of the treated CWP relative to a sample of the untreated CWP when tested after storing for 7 days at a temperature range having an upper limit that is at least 28° C. (50° F.) below the sufficient temperature to dissolve at a pH of about 7 an equivalent concentration of lactose in water to the concentration of lactose to water that is in the untreated CWP. According to yet another aspect of the invention, a method is provided for utilizing a CWP in the feeding of a ruminant animal.

19 Claims, 2 Drawing Sheets

METHODS FOR IMPROVING THE STORAGE AND HANDLING CHARACTERISTICS OF CONDENSED WHEY PERMEATE AND FOR UTILIZING CONDENSED WHEY PERMEATE IN THE FEEDING OF A RUMINANT ANIMAL

CROSS-REFERENCE TO RELATED APPLICATIONS

This is a continuation-in-part of U.S. application Ser. No. 11/367,064, filed on Mar. 3, 2006, now U.S. Pat. No. 7,927,641, having for named inventors Joseph M. Harris and Paul Mostyn.

STATEMENT REGARDING FEDERALLY SPONSORED RESEARCH OR DEVELOPMENT

Not Applicable

REFERENCE TO MICROFICHE APPENDIX

Not Applicable

TECHNICAL FIELD

According to a main aspect, the invention relates to methods of improving the storage and handling characteristics of condensed whey permeate. In another aspect, the invention relates to methods of utilizing a condensed whey permeate ("CWP") for animal feed. In a further aspect, the invention relates to methods of utilizing a CWP in the feeding of a ruminant animal.

SUMMARY OF THE INVENTION

Whey comes from the manufacture of cheese. Whey permeate (sometimes also referred to as permeate processed whey) comes from a process of removing at least some of the protein from whey. The whey permeate is usually condensed to remove at least some of the water. A typical condensed whey permeate comprises about 35%-45% by weight total solids, of which total solids about 75%-80% by weight is lactose.

Plant output for a typical condensed whey permeate can be about 54° C.-66° C. (130° F.-150° F.). Upon cooling, lactose tends to crystallize out of solution from the condensed whey permeate. The crystallization tends to become like a hard rock candy at the bottom of a holding tank, which becomes a problem for storage and handling of the condensed whey permeate. The crystallization properties of condensed whey permeate and lactose solutions are well characterized.

To keep lactose from crystallizing out of solution, the condensed whey permeate must be kept at a sufficiently high temperature, which depends on the concentration of lactose in the condensed whey permeate. This makes the storage, transportation, and/or use of the condensed whey permeate difficult.

According to a first approach to defining the invention, a method of improving the storage and handling characteristics of a condensed whey permeates provided, the method comprising the steps of:
a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. is at a pH of less than 8; and
b. treating the CWP with at least a sufficient proportion of alkali to raise the pH to at least 8.

Preferably, the step of obtaining a CWP further comprises obtaining a CWP that does not exhibit substantial crystallization.

According to a second approach to defining the invention, a method of improving the storage and handling characteristics of a condensed whey permeate, the method comprising the steps of:
a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. does not exhibit substantial crystallization; and
b. treating the CWP with at least a sufficient proportion of alkali to reduce the amount of crystallization obtained using a 30 mesh screen for a sample of the treated CWP relative to a sample of the untreated CWP when tested after storing for 7 days at a temperature range having an upper limit that is at least 28° C. (50° F.) below the sufficient temperature to dissolve at a pH of about 7 an equivalent concentration of lactose in water to the concentration of lactose to water that is in the untreated CWP.

According to further aspects of the invention, a method of utilizing a condensed whey permeate to make an animal feed is provided, wherein, after treating a CWP according to the invention, the method further includes the steps of: storing the treated CWP; and mixing the treated CWP with an animal feed ingredient. According to yet another aspect of the invention, a method is provided for utilizing a CWP in the feeding of a ruminant animal.

BRIEF DESCRIPTION OF THE DRAWING

The accompanying views of the drawing are incorporated into and form a part of the specification to illustrate several aspects and examples of the present invention. These figures together with the description serve to explain the general principles of the invention. The figures are only for the purpose of illustrating preferred and alternative examples of how the various aspects of the invention can be made and used and are not to be construed as unnecessarily limiting the invention to only the illustrated and described examples.

DETAILED DESCRIPTION OF THE INVENTION

Figure 1:
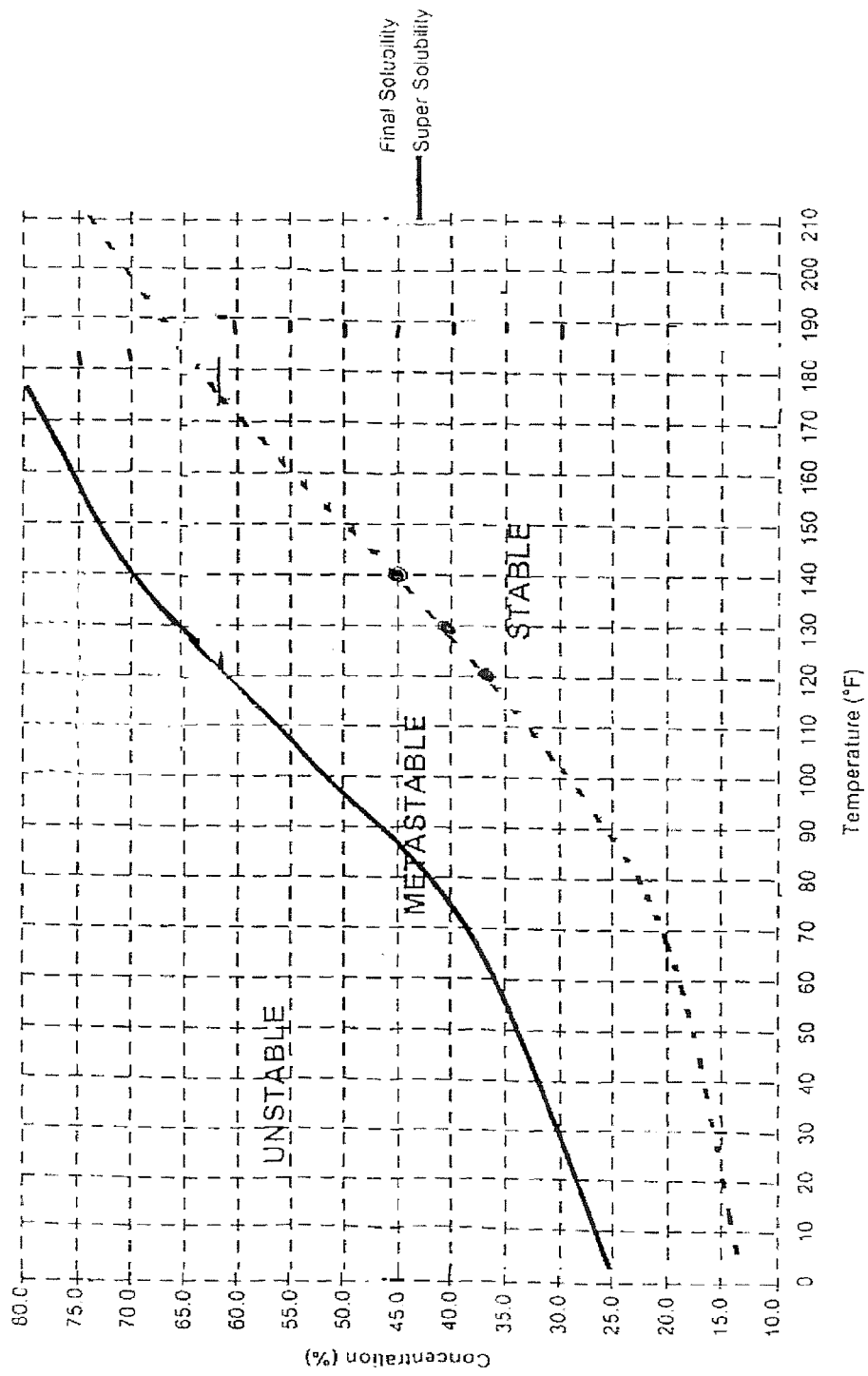
FIG. 1 is an example of a solubility curve for various concentrations of a particular sample of whey permeate, based on the total solids content in the condensed whey permeate.

According to the United States Department of Agriculture ("USDA") statistics, total cheese production in the United States in 1999 was 7.94 billion pounds. For every one pound of cheese produced, approximately 9 pounds of liquid whey result. This equates to almost 72 billion pounds of liquid whey produced nationally in 1999 alone.

In general, the whole liquid whey is sometimes processed in an ultrafiltration process that separates valuable proteins from the whole whey, resulting in a stream that is relatively rich in protein known as "whey protein concentrate" and a stream that is relatively rich in lactose and minerals, known as "whey permeate" or "deproteinized whey permeate."

However, few cheese manufacturers evaporate the whey permeate to produce condensed whey permeate or whey permeate solids. This is at least in part because the condensed whey permeate is difficult to store and handle. Most of the cheese manufacturers dispose of whey permeate as a waste byproduct directly on farmland, into rivers, and seas; and this poses a big environmental hazard due to the high biological oxygen demand (BOD) of the whey permeate.

It would be beneficial to find and develop processes to utilize more of this whey byproduct, most of which is disposed of as a waste product and which is harmful to the environment.

In more particular terms, "whey" (sometimes called "milk plasma" or "milk serum") is the liquid remaining after milk has been curdled and strained; it is a byproduct of cheese making with several commercial uses. The U.S. Food and Drug Administration ("FDA") defines whey as "the liquid substance obtained by separating the coagulum from milk, cream, or skim milk in cheese making." Whey can be obtained by acid, heat, and rennet coagulation of milk. Whey contains protein, lactose, vitamins, minerals, and traces of fat. U.S. Code of Federal Regulations, Title 21, Volume 3, Revised as of Apr. 1, 2005, Section 184.1979 (a)(1).

There are two main types of whey: "acid whey" and "sweet whey." Acid whey (also known as "sour whey") is obtained during making of acid type of cheese such as cottage cheese. Sweet whey is manufactured during making of rennet type hard cheese like cheddar or Swiss cheese. The FDA defines acid whey and sweet whey as follows: "Whey obtained from a procedure, in which a significant amount of lactose is converted to lactic acid, or from the curd formation by direct acidification of milk, is known as acid whey. Whey obtained from a procedure in which there is insignificant conversion of lactose to lactic acid is known as sweet whey. Sweet whey has a maximum titratable acidity of not more than 0.16 percent, calculated as lactic acid, and an alkalinity of ash of not more than 225 milliliters of 0.1 N hydrochloric acid per 100 grams. The acidity of whey, sweet or acid, may be adjusted by the addition of safe and suitable pH-adjusting ingredients." U.S. Code of Federal Regulations, Title 21, Volume 3, Revised as of Apr. 1, 2005, Section 184.1979 (a)(1).

"Concentrated whey" is "the liquid substance obtained by the partial removal of water from whey, while leaving all other constituents in the same relative proportions as in whey." U.S. Code of Federal Regulations, Title 21, Volume 3, Revised as of Apr. 1, 2005, Section 184.1979 (a)(2).

"Dry whey" or "dried whey" is "the dry substance obtained by the removal of water from whey, while leaving all other constituents in the same relative proportions as in whey." U.S. Code of Federal Regulations, Title 21, Volume 3, Revised as of Apr. 1, 2005, Section 184.1979 (a)(3).

The analysis of whey, concentrated whey, and dry (dried) whey, on a dry-product basis, based on analytical methods in the referenced sections of "Official Methods of Analysis of the Association of Official Analytical Chemists," 13th ed. (1980), which is incorporated by reference in accordance with 5 U.S.C. 552(a) and 1 CFR part 51, is given in paragraphs (b)(1)(i) through (b)(1)(vii) of this section. Copies may be obtained from the Association of Official Analytical Chemists International, 481 North Frederick Ave., Suite 500, Gaithersburg, Md. 20877, or may be examined at the Center for Food Safety and Applied Nutrition's Library, Food and Drug Administration, 5100 Paint Branch Pkwy., College Park, Md. 20740, or at the National Archives and Records Administration (NARA). U.S. Code of Federal Regulations, Title 21, Volume 3, Revised as of Apr. 1, 2005, Section 184.1979 (b)(1).

According to FDA specifications (U.S. Code of Federal Regulations, Title 21, Volume 3, Revised as of Apr. 1, 2005, Section 184.1979 (b)(1)), whey has the following composition, on a dry-product basis:

(i) Protein content, 10 percent to 15 percent—as determined by the methods prescribed in section 16.036 (liquid sample), entitled "Total Nitrogen—Official Final Action" under the heading "Total Solids," or in section 16.193 (dry sample), entitled "Kjeldahl Method" under the heading "Protein-Official Final Action."

(ii) Fat content, 0.2 percent to 2.0 percent—as determined by the methods prescribed in section 16.059 (liquid sample), "Reese-Gottlieb Method [Reference Method] (11)—Official Final Action" under the heading "Fat," or in section 16.199 (dry sample), entitled "Fat in Dried Milk (45)—Official Final Action."

(iii) Ash content, 7 percent to 14 percent—as determined by the methods prescribed in section 16.035 (liquid sample), entitled "Ash (5)—Official Final Action" under the heading "Total Solids," or in section 16.196 (dry sample), entitled "Ash—Official Final Action" under the heading "Dried Milk, Nonfat Dry Milk, and Malted Milk."

(iv) Lactose content, 61 percent to 75 percent—as determined by the methods prescribed in section 16.057 (liquid sample), entitled "Gravimetric Method—Official Final Action" under the heading "Lactose," or in section 31.061 (dry sample), entitled "Lane-Eynon General Volumetric Method" under the heading "Lactose—Chemical Methods—Official Final Action."

(v) Moisture content, 1 percent to 8 percent—as determined by the methods prescribed in section 16.192, entitled "Moisture (41)—Official Final Action" under the heading "Dried Milk, Nonfat Dry Milk, and Malted Milk."

(vi) Solids content, variable—as determined by the methods prescribed in section 16.032, entitled "Method I—Official Final Action" under the heading "Total Solids."

(vii) Titratable Acidity, variable—as determined by the methods prescribed in section 16.023, entitled "Acidity (2)—Official Final Action" under the heading "Milk," or by an equivalent potentiometric method.

The whey composition can vary to some extent, depending on the type of cheese, use of different starter culture and different rennet type. Further, the milk composition can also vary due to seasonal variations or breed of cows.

Whey can be recovered and processed for a variety of uses, including in animal feed, human food products, and pharmaceuticals. Most of the whey used in different food products is obtained as sweet whey from rennet types of hard cheeses.

Whole whey can be concentrated to remove some of the water content. For example, whole whey can be concentrated by evaporation techniques to produce a whey concentrate having a water content of less than about 50%. The whey concentrate would include substantial amounts of protein, lactose, and minerals.

More commonly, however, whole whey is processed to separate at least some of the proteins from the whole whey, resulting in a stream that is relatively rich in proteins known as whey protein concentrate and a stream that is relatively rich in lactose and minerals, known as "whey permeate" or sometimes "deproteinized whey permeate." Whey protein concentrate is produced by physical separation techniques such as precipitation, filtration, or dialysis. The most common method for separating protein from the whole whey is an ultrafiltration process.

The whey protein concentrate is an off-white colored product with little taste and is usually dried to powder form. Whey protein concentrate is the portion of whey obtained by the removal of sufficient non-protein constituents from whey so that the dry product contains not less than 25% protein. As with whole whey, whey protein concentrate can be used as a fluid, concentrate, or dry product form. The acidity of whey protein concentrate may be adjusted by the addition of safe and suitable pH-adjusting ingredients.

The "whey permeate" (sometimes referred to as "deproteinized whey permeate") contains most of the lactose, vitamins, and other materials separated from the whole whey by the separation process. Typically, the whey permeate has a total solids concentration of about 6% by weight, and typically sufficient protein is removed from the whey to produce a whey permeate having a dry solids content of about 75%-80% by weight lactose. Thus, a whey permeate usually contains about 4.5% lactose by weight.

Lactose is a disaccharide. The name comes from the Latin word for milk, plus the -ose ending used to name sugars. Lactose is a disaccharide consisting of two subunits, a galactose and a glucose linked together. Its empirical formula is $C_{12}H_{22}O_{11}$, and its molecular weight is 342.3 g/mole. In the intestine of young mammals, an enzyme called lactase is secreted by the intestinal villi, and this enzyme cleaves the molecule into its two subunits for absorption.

Thus, the whey permeate can be used to produce products such as lactose, and, if desired, the lactose can be further processed to make glucose.

In further processing of the whey permeate, however, the temperature should be controlled to avoid exceeding the temperature at which lactose will begin to caramelize. Lactose will begin to caramelize at 150° C.-160° C. (302° F.-318° F.) and turn brown at 175° C. (347° F.). The temperature sensitivity of lesser components in the whey permeate should also be considered.

As mentioned previously, the whey permeate has a relatively low concentration of some valuable materials, mostly lactose. A problem is that the concentration of these valuable materials in the water is so low that the whey permeate cannot be stored or transported or used cost effectively in that form, primarily due to the weight of the water. All too often, the whey permeate is simply disposed of as a waste byproduct.

At some expense, the whey permeate can be condensed by removing some of the water to obtain concentrated whey permeate or "condensed whey permeate". It is desirable to concentrate the whey permeate for transportation and to facilitate its use. On the other hand, for many applications the complete drying or crystallization of the lactose would be an unnecessary cost.

During the condensing of the whey permeate, attention should be paid to the $Ca_3(PO_4)_2$ complex, which is naturally present in the whey permeate. Ca-phosphate is a salt that will precipitate if the concentration and temperature increase, especially if the concentration is high and the pH is low. If the Ca++ is not inactivated, the precipitation will occur as deposits on the heat surface in the evaporator, especially in the first effect. If the problem is not addressed, it is necessary to make an intermediate cleaning of the evaporator after 6-8 hours with acid.

In the industry, the Ca-phosphate is sometimes precipitated in the whey permeate by adjusting the pH to 7.2 by addition of caustic (e.g., $Mg(OH)_2$ or $NaOH$), after which the product is heated to about 80° C. (176° F.). The precipitated Ca-phosphate then can be removed by centrifugation or membrane filtration. The discharged product can be dried and sold as "milk calcium". After removing the precipitated Ca-phosphate, the remaining whey permeate product can be evaporated directly, but it is typically recommended to "neutralize" it by adding citric acid, as it will otherwise give problems with deposits in the drying chamber.

The whey permeate is condensed to a CWP having a reduced water content relative to the whey permeate. The concentration of the whey permeate can be done either in a hyperfiltration plant and an evaporator or in an evaporator alone. Preferably, with an ordinary falling film evaporator, whey or whey permeate can be concentrated to have between about 20% and about 75% dry matter and about 80% to about 25% water, by weight. It is believed that reducing the water content is important to achieve substantial advantage in storage and shipping costs. Typically, the CWP has a dry matter content of about 40% and water of about 60%. Thus, a typical condensed whey permeate having about 40% total solids of which about 75% by weight is lactose has about 30% by weight lactose.

The concentration of lactose in aqueous solution can be determined analytically by various methods known to chemists who work with lactose and lactose containing materials, including polarimetry, oxidation and reduction titration, calorimetric methods, chromatographic methods, and enzymatic methods.

In a typical condensing processes, a typical condensed whey permeate with about 38% to 42% by weight dry matter comes out of the evaporator at a pH of about 5-5.6 and a temperature of about 54° C.-66° C. (130° F.-150° F.), and preferably at a temperature of at least about 60° C. (140° F.).

A problem, however, is that the solubility of lactose decreases rapidly with decreasing temperature. For example, lactose solubility is about 98 g/100 g water at 80° C. (176° F.); about 22 g/100 g water at 25° C. (77° F.), about 18 g/100 g water at 20° C. (68° F.); and only about 11 g/100 g water at 4° C. (39° F.), when measured at about a neutral pH of 7. The lower solubility of lactose at lower temperatures results in crystallization.

Based on this known solubility of lactose in water at various temperatures, a condensed whey permeate having a total solids content of which about 75% by weight is lactose, the temperature to maintain the lactose in solution and avoid crystallization would be expected to approximately as follows:

TABLE 1

Approximate Relationship between Total Solids in a Condensed Whey Permeate and Lactose Solubility

| % Total Solids (by weight) | % Lactose (by weight) | % Water (by weight) | Equivalent g Lactose/ 100 g water | Stable Solubility Temperature |
|---|---|---|---|---|
| 56 | 42 | 44 | 98 g | 80° C. (176° F.) |
| 44 | 33 | 56 | 59 g | 60° C. (140° F.) |
| 23 | 17 | 77 | 22 g | 25° C. (77° F.) |
| 19 | 14 | 81 | 18 g | 20° C. (68° F.) |
| 12 | 9 | 88 | 11 g | 4° C. (39° F.) |

FIG. 1 shows an example of a solubility curve for various concentrations of a particular sample of whey permeate, based on the total solids content in the condensed whey permeate. The dashed line represents the concentration of total solids vs. temperature at or under which the solution is "stable," meaning that, for the given concentration of total solids, the solution will not exhibit substantial crystallization at or above that temperature. The solid line represents the concentration of total solids vs. temperature at or under which the solution is "metastable," meaning that the rate of initiation of crystallization is slow; aggregates of molecules form but then disperse again, and they will not grow unless seed crystals are added. As shown by the two graphed lines in FIG. 1, for a given concentration of total solids in the concentrated whey permeate, the metastable temperature is at least about 28° C. (50° F.) below the stable temperature. The stable temperature is expected to be about the same temperature at which an equivalent concentration of lactose in water would be completely soluble. Any concentration of lactose above the solid line would be "unstable," meaning that rapid crystallization would be observed. As will be understood by those of skill in the art, however, approximately similar but non-identical curves would be expected depending on the exact composition of the whey permeate used and the lactose concentration in the whey permeate. A person of skill in the art can establish the particular solubility curve for a particular whey permeate composition.

Thus, unless the temperature of a condensed whey permeate is maintained at or above the sufficient temperature to maintain the lactose dissolved in the solution, the solution will soon begin to exhibit crystallization. Over time, the crystallization from condensed whey permeate tends to become like rock candy at the bottom of the holding tank. This makes condensed whey permeate difficult to store and use. For example, for a typical condensed whey permeate having about 40% by weight solids content, of which about 75% by weight of the dry solids is lactose, unless the temperature is maintained above about 54° C.-66° C. (130° F.-150° F.) depending on the exact concentration of lactose in the condensed whey permeate, the solution will begin to exhibit substantial crystallization. This prevents the use of condensed whey permeate in many food processes as they have a unpleasant sandy texture and are readily prone to microbiological spoilage.

"Crystallization" is the process of formation of solid crystals from a homogeneous solution. For crystallization to occur, the solution at hand ought to be supersaturated. Put simply, the solution should contain more solute molecules than it would under ordinary conditions. This can be achieved by various methods—solvent evaporation, cooling, chemical reaction. Crystallization is the phenomenon of crystalline formation by nucleation and accretion. The freezing of water into ice is one of the common examples of crystallization in nature.

"Supersaturation" or "oversaturation" refers to a solution that contains more of the dissolved material than could be dissolved by the solvent under existing circumstances. Small particles (seeds) can trigger the separation of the dissolved material from the solvent. In the solid form, these seeds can lead to the formation of crystallites or even large single crystals. Supersaturated solutions are prepared or result when some condition of a saturated solution is changed, for example, temperature, volume (as by evaporation). In the case of a condensed whey permeate, after the condensing processes, the solution tends to become supersaturated with lactose by the reduction in temperature.

It has been discovered that treating a condensed whey permeate with alkali unexpectedly improves the storage and handling characteristics of a condensed whey permeate. As will hereinafter be described in more detail, this allows a condensed whey permeate to be stored and subsequently utilized, for example, in an animal feed.

According to a first approach to defining the invention, a method of improving the storage and handling characteristics of a condensed whey permeate is provided, the method comprising the steps of:
  a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. is at a pH of less than 8; and
  b. treating the CWP with at least a sufficient proportion of alkali to raise the pH to at least 8.

Preferably, the step of obtaining a CWP further comprises obtaining a CWP that does not exhibit substantial crystallization.

According to a second approach to defining the invention, a method of improving the storage and handling characteristics of a condensed whey permeate, the method comprising the steps of:
  a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. does not exhibit substantial crystallization; and
  b. treating the CWP with at least a sufficient proportion of alkali to reduce the amount of crystallization obtained using a 30 mesh screen for a sample of the treated CWP relative to a sample of the untreated CWP when tested after storing for 7 days at a temperature range having an upper limit that is at least 28° C. (50° F.) below the sufficient temperature to dissolve at a pH of about 7 an equivalent concentration of lactose in water to the concentration of lactose to water that is in the untreated CWP.

According to the second aspect, preferably, and as will hereinafter be described in more detail, the step of obtaining a CWP further comprises: obtaining a CWP that has a total solids content of at least 30% by weight; and wherein the step of treating the CWP further comprises: treating the CWP with at least a sufficient proportion of alkali to reduce the amount of crystallization obtained using a 30 mesh screen for a sample of the treated CWP relative to a sample of the untreated CWP when tested after storing for 7 days at about 22° C. (72° F.).

Preferably, according to the a further approach for defining the invention, the step of obtaining a CWP further comprises: obtaining a CWP that is at a temperature that is at least as high as the sufficient temperature for a metastable solution of the CWP determined at a pH within the range of about 5 to about 7, but below 150° C. (302° F.). More preferably, the step of obtaining a CWP further comprises: obtaining a CWP that is at a temperature that is at least as high as the sufficient temperature for a stable solution of the CWP determined at a pH within the range of about 5 to about 7, but below 150° C. (302° F.). According to an alternative further approach to defining the invention, the step of obtaining a CWP further comprises: obtaining a CWP that is at a temperature at least as high as the sufficient temperature to dissolve an equivalent concentration of lactose in water at a pH of about 7, but below 150° C. (302° F.).

A presently most-preferred source of condensed whey permeate is from the making of cheddar cheese. Further, a presently most-preferred source of condensed whey permeate is from a deproteinization utilizing an ultrafiltration process.

Unless the condensed whey permeate is already well characterized or known by experience, the methods preferably further comprise the step of: prior to treating the CWP, determining the concentration of lactose in the CWP.

As used herein, an "alkali" is a specific type of base, formed as a carbonate, hydroxide or other ionic salt of an alkali metal or alkali earth metal element. The alkali metals are the series of elements in Group 1 (IUPAC style) of the periodic table, excluding hydrogen: that is, lithium (Li), sodium (Na), potassium (K), rubidium (Rb), caesium (Cs), and francium (Fr). The alkaline earth metals are the series of elements in Group 2 (IUPAC style) of the periodic table: beryllium (Be), magnesium (Mg), calcium (Ca), strontium (Sr), barirum (Ba).

According to the invention, it is preferable to use an alkali, or combination of alkali, that is soluble in the CWP at the sufficient proportion of alkali. More preferably, the alkali is selected from the group consisting of: sodium hydroxide, potassium hydroxide, and any combination thereof in any proportion. While other alkali may be used, they can be less desirable from a nutrition perspective, and some of the available sources of alkali are expected to be much less desirable from a cost perspective. Most recently, partly due to price increases for sodium and potassium hydroxide and partly due to the dietary benefits of calcium, calcium hydroxide has become the most-preferred source of alkali.

Based on preliminary testing, it is presently believed that, when the alkali is sodium hydroxide, the sufficient proportion is 0.5% by weight of sodium hydroxide to 32% by weight of lactose. Most preferably, however, the methods according to the invention can further comprise the step of: determining the sufficient proportion of alkali.

The methods according to the invention are practiced most advantageously on a continuous basis rather than on a batch basis. Preferably, the step of treating the CWP with alkali further comprises: continuously treating a stream of the CWP with alkali. When practiced on a continuous basis, it is also advantageous and preferred to continuously determine the concentration of lactose in the stream of the CWP. Further, the step of continuously treating a stream of the CWP with alkali more preferably comprises: adjusting the amount of alkali in proportion to the amount of lactose in the stream of the CWP.

The methods advantageously can further comprise the step of: storing the treated CWP. Preferably, according to one approach to defining the invention, the step of storing the treated CWP further comprises: storing the treated CWP at a temperature range having an upper limit that is at least 28° C. (50° F.) below the sufficient temperature for a stable solution of the CWP determined at a pH within the range of about 5 to about 7. According to another approach to defining the invention, the step of storing the treated CWP further comprises: storing the treated CWP at a temperature range having an upper limit that is at least 28° C. (50° F.) below the sufficient temperature to dissolve an equivalent concentration of lactose in water at a pH of about 7. The treatment of the CWP according to the invention allows the treated CWP to be stored with less secondary heat, and preferably with no secondary heat, depending on the particular concentration of the CWP.

Preferably, the step of storing the treated CWP further comprises: storing the treated CWP at a temperature range having a lower limit that is at least above 0° C. (32° F.). This is desirable to prevent the freezing of the water in the treated CWP.

In a preferred embodiment of the invention, the step of obtaining a CWP further comprises: obtaining a CWP with between about 30% by weight to about 50% by weight total solids content; and wherein the step of storing the treated CWP further comprises: storing the treated CWP at a temperature range that has a lower limit that is at least above 0° C. (32° F.) and that has an upper limit that is up to about 27° C. (80° F.). This is believed to represent an economical compromise for the evaporation costs to make a condensed whey permeate and an economical temperature range for storage of the treated CWP.

According to the methods of the invention, the step of storing the treated CWP further comprises: storing the treated CWP for at least 7 days. More preferably, the methods allow for the storing of the treated CWP for at least 28 days. Any crystallization should be easily re-dispersed by agitation back into the fluid so that, even if not homogeneous, the solution can be handled as a fluid.

Preferably, the step of storing the treated CWP further comprises: storing the treated CWP in a container that provides for agitation of the treated CWP. It has been discovered that treating a CWP with alkali according to the invention allows minimal agitation of the treated CWP to re-disperse any crystallization back into the fluid. Thus, the invention improves the handleability of the treated CWP relative to untreated CWP.

For example, the step of storing further comprises: storing in a container that has a mixing blade that can be rotated to agitate the treated CWP. By way of another example, the step of storing preferably further comprises: storing in a container that has an air delivery system that can be used to deliver air into the bottom of the container to agitate the treated CWP.

According to a still further aspect of the invention, the methods can further comprise the step of: transporting the treated CWP. Preferably, the step of transporting the treated CWP further comprises: transporting the treated CWP in a container with baffles to help agitate the treated CWP during transportation in the container.

According to yet another aspect of the invention, a method of utilizing a condensed whey permeate to make an animal feed is provided. This method comprises the steps of:
  a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. is at a pH of less than 8;
  b. treating the CWP with at least a sufficient proportion of alkali to raise the pH to at least 8;
  c. storing the treated CWP; and
  d. mixing the treated CWP with an animal feed ingredient.

Preferably, the step of obtaining a CWP further comprises obtaining a CWP that does not exhibit substantial crystallization.

According to another approach to defining an invention method of utilizing a condensed whey permeate to make an animal feed, the method comprising the steps of:
  a. obtaining a CWP that:
    i. has a total solids content in the range of about 20% to about 75% by weight and has a water content in the range of about 80% to about 25% by weight;
    ii. has a lactose concentration of at least 70% by weight of the total solids content; and
    iii. does not exhibit substantial crystallization;
  b. treating the CWP with at least a sufficient proportion of alkali to reduce the amount of crystallization obtained using a 30 mesh screen for a sample of the treated CWP relative to a sample of the untreated CWP when tested after storing for 7 days at a temperature range having an upper limit that is at least 28° C. (50° F.) below the sufficient temperature to dissolve at a pH of about 7 an equivalent concentration of lactose in water to the concentration of lactose to water that is in the untreated CWP;
  c. storing the treated CWP; and
  d. mixing the treated CWP with an animal feed ingredient.

Preferably, according to this aspect and approach to defining the invention, the step of obtaining a CWP further comprises: obtaining a CWP that has a total solids content of at least 30% by weight; and wherein the step of treating the CWP further comprises: treating the CWP with at least a sufficient proportion of alkali to reduce the amount of crystallization obtained using a 30 mesh screen for a sample of the treated CWP relative to a sample of the untreated CWP when tested after storing for 7 days at about 22° C. (72° F.).

It should be understood, of course, that the further aspect of the invention as previously described according to the methods of improving the storage and handling characteristics of a condensed whey permeate also apply to the methods of utilizing a condensed whey permeate to make an animal feed.

Preferably, the step of mixing comprises: spraying the treated condensed whey permeate onto the animal feed ingredient.

Preferably, the animal feed ingredient is a high-fiber animal feed ingredient.

The method preferably further comprises the step of: reducing water content in the mixture of the treated CWP and the animal feed ingredient. More preferably, the step of reducing water content in the mixture comprises: reducing water content of the mixture to less than or equal to about 10 wt %. The step of reducing water content in the mixture comprises the step of: evaporating water content from the mixture. For example, the step of evaporating water content from the mixture can comprise: solar evaporation. The mixture can be baled up and sold to a feed yard for use as an animal feed or animal feed ingredient. Alternatively, the method can include the step of allowing the mixture to "ensile" in large, commercially applied plastic bags.

Furthermore, the method of utilizing the CWP preferably further comprises: the step of transporting the treated CWP to an animal feed lot prior to the step of mixing the treated CWP with an animal feed ingredient. Still further, the method further comprises the step of feeding the mixture to livestock.

It is believed that an additional benefit of the invention is that alkali additions to high fiber feedstocks improve digestibility of the dietary fiber due to assisting in the solubilizing of lignin. Further, inclusion of sugar, such as lactose, should further enhance the subsequent utilization of the material by ruminant animals.

EXAMPLE I

The objective of this example was too quantify the effects of adding 2% by weight alkali (i.e., a 50% by weight solution of NaOH in water) to liquid whey permeate to improve its storage and handling.

The materials and equipment used included the following:
  a) Condensed whey permeate from a cheddar cheese plant;
  b) 50% by weight sodium hydroxide (NaOH) in water;
  c) 2000 ml Beaker;
  d) Stir plate;
  e) Stir bar;
  f) 250 ml sample bottles;
  g) 12, 30, 50, 70, 200, and 325 mesh sieves with a bottom and lid;
  h) Reagent grade alcohol in a fine tipped dispensing bottle;
  i) Roto-Tap Vibrator;
  j) Balance (at least 0.1 g readability);
  k) Oven;
  l) Thermometer;
  m) Appropriate safety equipment; and
  n) 100 ml graduated cylinders.

The quantification of untreated and treated CWP crystallization was tested with sieves according to the following procedure:
  a) Obtaining a sufficient quantify of CWP having the following characteristics:
    i. Product description—Fresh, concentrated whey permeated, light yellowish in color, unadulterated and free of any material diluents. The CWP results from a process of ultrafiltration with the byproduct whey permeated being concentrated through reverse osmosis and evaporation;
    ii. Color—Light yellowish;
    iii. Phase—Liquid;
    iv. Taste—Mild sweet milky taste;
    v. Aroma—Mild milky aroma;
    vi. Total Solids—38.0% to 42.0% by weight AOAC Method 31.076-31.078;
    vii. Crude Protein (N×6.38)—3.5% by weight minimum (on dry basis) AOAC Method 930.29;
    viii. Lactose—80% by weight minimum (on dry basis) AOAC Method 980.13;
    ix. Shipping Temperature—60° C. (140° F.) minimum;
    x. pH—5.8-7;
    xi. Ash—11.0% by weight maximum (on dry basis) AOAC Method 930.30;
    xii. Salt—5.0% by weight maximum (on dry basis) AOAC 16.235;
    xiii. Galactose—300 mg/100 ml maximum;
    xiv. Inhibitor—None; and
    xv. Hydrogen Peroxide—3 ppm maximum.
  b) At time of receipt of CWP, collected enough sample to produce enough untreated (i.e., control) and treatment samples for day 1 through day 28 testing of the untreated and treated CWP samples on a weekly basis. The temperature of the untreated CWP should be above 54° C.-60° C. (130° F.-140° F.).
  c) If the untreated CWP is not at the minimum required temperature, which, under the specifications for the particular untreated CWP is at least as high as the metastable temperature and probably at least as high as the stable temperature, the CWP should be sampled top, middle, and bottom to verify that there is no sign of crystallization. If crystals exist, unload the whey into a tank that can be heated and mixed. Heat the CWP to about 77° C. (170° F.) and hold it at that temperature for at least 30 minutes to 1 hour while continuously mixing. Samples should be taken to verify that no crystals exist. Once the crystals are completely re-dissolved, obtain the samples.

d) Add 250 g of the untreated CWP to each of five separate 250 ml sample bottles and label each as the untreated CWP and according to day the sample will be tested (e.g., day 1, 7, 14, 21, and 28).

e) Add 1500 g of the untreated CWP to a 2000 ml beaker. Place on the stir plate and add a stir bar. Begin stirring. Set the speed of the stir plate so that a moderate vortex is generated in the sample.

f) Add 2% (30 g) sodium hydroxide (in the form of the 50% NaOH solution) to the untreated CWP in the 2000 ml beaker and stir for an additional 5 minutes.

g) Pour 250 g of the treated CWP into five separate 250 ml sample bottles and label each as the treated CWP and according to the day it will be tested for crystallization (e.g., day 1, 7, 14, 21, and 28) maintained at approximately room temperature, i.e., 21° C.-24° C. (70° F.-75° F.).

h) At each designated test date for the untreated and treated CWP samples, weigh and record the weight of each sieve (clean and dry). Once weighed, stack the sieves from largest to smallest, top to bottom.

i) Pour the untreated CWP (control) sample through the sieve.

j) Rinse out the sample bottle with a small amount of reagent grade alcohol and then pour the rinse through the sieve.

k) Allow the sample to drain through the stack of sieves for one hour.

l) Rinse each sieve with a small amount of alcohol and cover with a lid.

m) Place the sieves on the Roto-Tap machine for 10 minutes.

n) Remove the sieves from the Roto-Tap and dry them in an oven at about 113° C. (235° F.) for 30 minutes.

o) Allow the sieves to cool, then weigh each sieve to determine the amount of crystallized material that was retained on each sieve.

p) Repeat steps (h)-(o) for all samples.

The quantification of treated and untreated CWP for settling was also tested with graduated cylinders according to the following procedure:

a. At time of receipt of untreated CWP, collect enough sample to produce at least 200 ml of a control sample and 200 ml of a treatment sample.

b. Add 80-100 ml from the control and treatment sample to the 100 ml graduated cylinder. Record the volume of the whey in each cylinder.

c. To determine the degree of settling, subtract the bottom layer height reading from the total volume that remains in the cylinder at days 1, 7, 14, 21, and 28 maintained at approximately room temperature, i.e. about 21° C.-24° C. (70° F.-75° F.).

d. Repeat the determination for each sample.

| | Results of Sieve Testing | | | | | | |
|---|---|---|---|---|---|---|---|
| | Sieve Size | | | | | | |
| | 12 | 30 | 50 | 70 | 200 | 325 | All Sieves |
| | % material retained on Sieve | | | | | | Accumulated % |
| Day 1 Untreated CWP | 0.45 | 0.85 | 1.4 | 1.65 | 4.2 | 6.25 | 14.8 |
| Day 1 Treated CWP | 0.4 | 0.75 | 1 | 1.1 | 2.35 | 2.35 | 7.95 |
| Day 7 Untreated CWP | 2.65 | 9.25 | 3.45 | 2.65 | 3.6 | 6.3 | 27.9 |
| Day 7 Treated CWP | 0.1 | 0.8 | 1.55 | 1.35 | 0.7 | 1 | 5.5 |
| Day 14 Untreated CWP | 4.05 | 10.3 | 3.15 | 3.2 | 4.05 | 4.15 | 28.9 |
| Day 14 Treated CWP | 0.15 | 1.15 | 1.9 | 1.65 | 1.55 | 1.55 | 7.95 |
| Day 21 Untreated CWP | 5.05 | 11.3 | 3.6 | 4.2 | 3.95 | 4.6 | 32.7 |
| Day 21 Treated CWP | 0.75 | 0.9 | 2.75 | 2.65 | 0.25 | 2.25 | 9.55 |
| Day 28 Untreated CWP | 3.45 | 14.1 | 4.3 | 1.7 | 2.7 | 0.4 | 26.65 |
| Day 28 Treated CWP | 0 | 0.45 | 1.3 | 1.35 | 1.3 | 5.95 | 10.35 |

Figure 2:
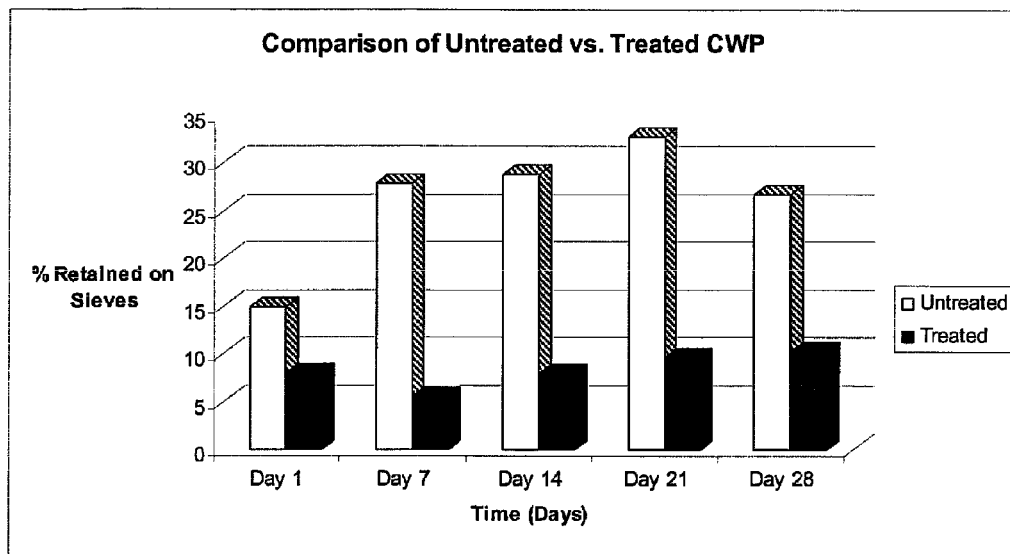
FIG. 2 shows a comparison of the total accumulated retained percentage of crystallization material for each of the untreated CWP and treated CWP at days 1, 7, 14, 21, and 28.
Figure 3:
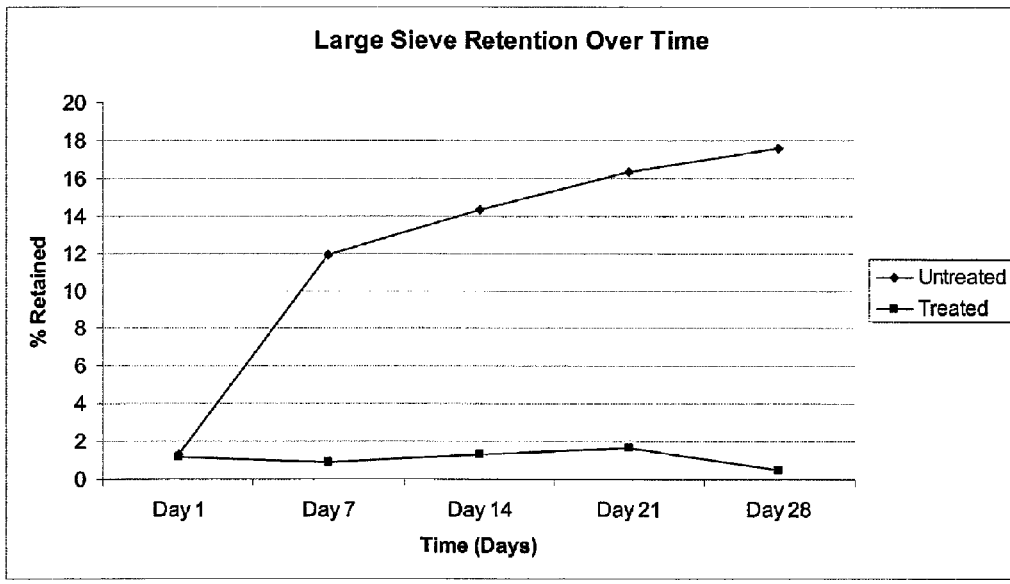
FIG. 3 shows a comparison of the accumulated retained percentage of crystallization material on the large size (30 mesh) screen for each of the untreated CWP and treated CWP samples at days 1, 7, 14, 21, and 28.

The results of this testing are summarized in FIG. 2 and FIG. 3. FIG. 2 shows a comparison of the total accumulated retained percentage of crystallization material for each of the untreated CWP and treated CWP at days 1, 7, 14, 21, and 28. FIG. 3 shows the a comparison of the accumulated retained percentage of crystallization material on the large size (30 mesh) screen for each of the untreated CWP and treated CWP samples at days 1, 7, 14, 21, and 28.

Samples treated with sodium hydroxide showed considerable improvement in their handling characteristics. Treated samples retained less weight than the control samples on the sieves. The graphs of the sieve analysis data shown in FIGS. 2 and 3 demonstrate that more total crystallization and large-size crystallization occurred in the untreated control samples than in the treated samples over time. This is confirmed further by the second trial using the graduated cylinders to measure the rate of settling over time.

EXAMPLE II

A basal diet was prepared to meet the requirements of a lactating dairy cow producing 90 lb milk/day. Two whey products were obtained. A strong alkali solution (calcium hydroxide) was added to one of the whey products ("the treated whey") to prevent crystal formation and fermentation during storage. The alkali solution was not added to the other whey product ("the untreated whey"). Either the untreated or the treated whey replaced 3% of the steam flaked corn (% dry matter basis) in the control diet. Urea was added to the whey diets to ensure that the diets were isonitrogenous.

Diets were identified in the following manner: (1) "Control" having 0% whey; (2) "untreated whey" added to the diet at 3% of dry matter; and (3) "treated whey" added at 3% of dry matter.

Diet composition, forage analyses, and diet analyses of the diets are shown in Tables 2, 3, and 4, respectively.

TABLE 2

Diet Composition, % Dry Matter Basis

| Ingredient | Control | Untreated or Treated Whey |
| --- | --- | --- |
| Alfalfa hay | 25.21 | 25.21 |
| Grass hay | 6.89 | 6.89 |
| Corn Silage | 28.06 | 28.06 |
| Soybean hulls | 6.07 | 6.07 |
| Steam flaked corn | 20.31 | 17.25 |
| Soybean meal 47.5 | 9.85 | 9.85 |
| Whey | 0.00 | 3.00 |
| Urea | 0.30 | 0.36 |
| Megalac | 1.77 | 1.77 |
| Sodium Bicarbonate | 0.85 | 0.85 |
| Dicalcium phosphate | 0.30 | 0.30 |
| Trace mineralized salt | 0.18 | 0.18 |
| ADE vitamin premix | 0.18 | 0.18 |
| Vitamin E | 0.04 | 0.04 |

TABLE 3

Forage Analysis, % Dry Matter Basis

| | Ingredient | | |
| --- | --- | --- | --- |
| Component: | Alfalfa Hay | Grass Hay | Corn Silage |
| Dry Matter | 83.7 | 89.6 | 39.2 |
| Crude Protein | 24.6 | 13.2 | 6.5 |
| Soluble, % CP | 38.4 | 29.0 | 61.7 |
| ADICP, % CP | 3.6 | 6.8 | 1.7 |
| NDICP, % CP | 5.23 | 37.4 | 8.9 |
| NDF | 27.9 | 60.4 | 38.5 |
| Lignin, % NDF | 15.9 | 8.1 | 6.1 |
| ADF | 22.5 | 33.6 | 21.2 |
| NSC | 10.4 | 12.3 | 36.8 |
| Starch | 1.86 | 0.36 | 33.2 |
| Sugar (WSC) | 8.50 | 11.9 | 3.6 |
| Ether Extract | 2.4 | 3.2 | 2.3 |
| Ash | 11.4 | 7.9 | 3.4 |
| NFC[1] | 33.7 | 15.3 | 49.2 |

[1]Calculated Non-Fiber Carbohydrate
WSC = water soluble carbohydrates

TABLE 4

Diet Analysis, % Dry Matter Basis

| | | Diets | |
| --- | --- | --- | --- |
| Component | Control | Untreated Whey | Treated Whey |
| Crude Protein | 17.6 | 17.5 | 17.5 |
| Soluble Protein (% CP) | 32.5 | 33.0 | 32.5 |
| NDF | 29.6 | 29.5 | 29.4 |
| ADF | 19.64 | 19.52 | 19.48 |
| Hemicellulose | 9.96 | 9.98 | 9.92 |
| NSC[1] | 28.4 | 27.0 | 26.2 |
| Starch | 23.6 | 21.0 | 19.9 |
| Sugar (WSC) | 4.7 | 6.0 | 6.3 |

TABLE 4-continued

Diet Analysis, % Dry Matter Basis

| | | Diets | |
| --- | --- | --- | --- |
| Component | Control | Untreated Whey | Treated Whey |
| Ether Extract | 3.6 | 3.0 | 3.0 |
| Ash | 7.2 | 7.3 | 7.3 |
| NFC[2] | 42.1 | 42.8 | 42.9 |

[1]Nonstructural Carbohydrate (starch + water soluble carbohydrates)
[2]Calculated Non-Fiber Carbohydrate Continuous culture fermentations were conducted using conditions simulating rumen parameters of a lactating dairy cow. These conditions were:

| | |
| --- | --- |
| Liquid dilution rate | 13%/hr |
| Solids dilution rate | 4.55%/hr |
| Solids Retention Time | 22 hr |
| Feed Intake | 100 g DM/d |
| Feeding Frequency | 25 g DM, 4 times daily at 6 hour intervals |
| Fermentation temperature | 39° C. |
| pH | Recorded at 0.5 hr intervals |

Each diet was fermented in triplicate 9-day fermentations, with effluent samples composted for analysis during the last three days.

Statistical Analyses—Data were analyzed using the General Linear Model Procedures of SAS. A Duncan's Multiple Range Test at the 5% level of probability was used to detect differences among treatments.

Digestion coefficients are shown in Table 5. Compared to the control and untreated whey diets, digestion of organic matter ("OM") and crude protein ("CP") was significantly increased by the treated whey diet ($P<0.02$ and $P<0.01$, respectively). Digestion of acid detergent fiber ("ADF") was significantly decreased ($P<0.05$) by the untreated whey diet and was slightly decreased by the treated whey diet. Both whey diets tended to ($P<0.10$) increase digestion of the nonstructural carbohydrates ("NSC").

TABLE 5

Digestion Coefficients

| | | Diets | | |
| --- | --- | --- | --- | --- |
| Item | Control | Untreated Whey | Treated Whey | P = |
| Digestion, % | | | | |
| Dry Matter | 68.1 | 68.2 | 73.4 | 0.300 |
| Organic Matter | 56.5[b] | 57.9[b] | 61.8[b] | 0.015 |
| Crude Protein | 62.6[b] | 66.5[b] | 77.1[b] | 0.008 |
| NDF | 46.3 | 43.0 | 40.5 | 0.271 |
| ADF | 56.9[a] | 48.3[b] | 51.1[a,b] | 0.040 |
| Hemicellulose | 26.9[b] | 29.5[a] | 19.6 | 0.051 |
| NSC[1] | 81.5 | 86.0 | 85.3 | 0.078 |
| g Carbohydrate[2] digested/d | 36.8 | 35.9 | 34.2 | 0.231 |

[1]Nonstructural Carbohydrate, includes WSC and starch.
[2]g NDF + g Nonstructural carbohydrate digested per day.
[a,b]Values with different superscripts differ, P < 0.05.

Production and molar ratios of the volatile fatty acids ("VFA") as well as the average daily fermentation pH are shown in Table 6. Production of total VFA was not affected by the treatments; however, production of acetate and isobutyrate, in mM/day, was decreased by both treatments. Although propionate production was not affected, the decrease in acetate resulted in a marginal ($P<0.10$) decrease in the A/P ratio on both treatments. The change in acetate production caused decreases in the molar proportions of acetate (P<0.03) for both treatments compared to the control. The average daily pH was not affected, but the pH after feeding was significantly higher (P<0.05) for the untreated whey diet than for the control or treated whey diet (FIG. 6).

TABLE 6

Volatile Fatty Acid (VFA) Production, Molar Ratios and Average Daily Fermenter pH

| Item | Diets Control | Untreated Whey | Treated Whey | P = |
|---|---|---|---|---|
| Total VFA, mm/d | 386 | 359 | 363 | 0.226 |
| Molar %: | | | | |
| Acetic | 63.7[a] | 57.7[b] | 61.2[a,b] | 0.026 |
| Propionic | 17.9 | 19.4 | 17.9 | 0.236 |
| Isobutyric | 0.81 | 0.80 | 0.77 | 0.149 |
| Butyric | 14.3 | 16.1 | 15.3 | 0.231 |
| Isovaleric | 0.71 | 0.74 | 0.76 | 0.807 |
| Valeric | 2.5 | 5.3 | 4.0 | 0.144 |
| A-P Ratio | 3.56 | 2.99 | 3.43 | 0.090 |
| Mmoles/day: | | | | |
| Acetic | 246 | 207 | 223 | 0.060 |
| Propionic | 69 | 70 | 65 | 0.321 |
| Isobutyric | 3.13[a] | 2.88[a,b] | 2.79[b] | 0.037 |
| Butyric | 55 | 58 | 55 | 0.402 |
| Isovaleric | 2.8 | 2.7 | 2.8 | 0.895 |
| Valeric | 9.8 | 19.1 | 14.8 | 0.192 |
| Average pH | 6.30 | 6.38 | 6.28 | 0.112 |

[a,b]Values with different superscripts differ, P < 0.05.

Partition of nitrogen ("N"), microbial growth and microbial efficiency are shown in Table 5. Ammonia levels and flow of non-ammonia N ("NAN") were not affected by either whey product. The treated whey diet significantly decreased the by-pass N and increased the microbial N compared to the control and untreated whey diets (P<0.05). Efficiency of microbial growth, measured as microbial N/kg digested dry matter, OM or g total carbohydrate digested ("CHOD") was increased significantly by the treated whey diet compared to the control and untreated whey diet. The g digested protein N converted to microbial N was marginally (P=0.08) increased by both experimental diets compared to the control. Total VFA produced/kg microbial N, which shows the tendency to use nutrients for microbial growth rather than for VFA production, was significantly lower for both whey diets compared to the control (p<0.05) and was significantly lower for the treated than for the untreated whey diet (P<0.05).

TABLE 7

Nitrogen Partitioning, Microbial Growth and Microbial Efficiency

| Item | Diets Control | Untreated Whey | Treated Whey | P = |
|---|---|---|---|---|
| CP digested, % | 62.6[b] | 66.5[b] | 77.1[a] | 0.008 |
| Non-ammonia N, g/d | 2.94 | 2.96 | 2.95 | 0.838 |
| Ammonia N, mg/d | 5.62 | 4.86 | 4.71 | 0.504 |
| ByPass N, g/d | 1.18[a] | 1.05[a] | 0.72[b] | 0.009 |
| Microbial N, g/d | 1.76[b] | 1.91[b] | 2.24[a] | 0.003 |
| Efficiencies: | | | | |
| Mic. N/kg DMD[1] | 25.9[c] | 28.0[b] | 30.5[a] | 0.004 |
| Mic. N/kg OMD[2] | 33.7[b] | 35.6[a,b] | 39.0[a] | 0.027 |
| Mic. N/kg CHOD[3] | 48.1[b] | 53.3 | 65.4[a] | 0.010 |

TABLE 7-continued

Nitrogen Partitioning, Microbial Growth and Microbial Efficiency

| Item | Diets Control | Untreated Whey | Treated Whey | P = |
|---|---|---|---|---|
| Feed N, %[5] | 89.6 | 91.7 | 92.7 | 0.078 |
| TVFA/kg CHOD[6] | 10.5 | 10.0 | 10.6 | 0.621 |
| TVFA/kg Mic N[7] | 219[a] | 189[b] | 163[c] | 0.002 |

[1]Grams microbial N produced per kg dry matter digested.
[2]Grams Microbial N produced per kg total organic matter digested.
[3]Grams Microbial N produced per kg total carbohydrate digested.
[4]Digested feed N converted to microbial N, %.
[5]Moles VFA produced/kg carbohydrate digested.
[6]Moles VFA produced/kg Microbial N produced.
[a,b,c]Values with different superscripts differ, P < 0.05

Table 8 shows the composition of the microbes grown in the cultures. No compositional changes were noted.

TABLE 8

Effects of Treatments on the Composition of the Microbes

| Item | Diets Control | Untreated Whey | Treated Whey | P = |
|---|---|---|---|---|
| Nitrogen, % | 9.04 | 9.41 | 8.96 | 0.342 |
| Ash, % | 19.63 | 18.50 | 20.25 | 0.882 |
| RNA-N, % Total N | F17.66 | 17.94 | 15.68 | 0.242 |

In diets with adequate protein, such as the diets in this study, the primary factors that control microbial growth are the type and quantity of available carbohydrates and the microbial efficiency (microbes grown per unit of carbohydrate digested). It was clear from the digestibility data that the total g carbohydrate digested/day was decreased by both treatments, mainly due to decreased fiber digestion. It was apparent, therefore, that the increases in microbial growth seen on the whey diets, particularly the treated whey diet, could not have been caused by an increase in available carbohydrate. The type of carbohydrate available did differ, however. The analyses show changes in the proportions of carbohydrates coming from starch compared to sugar. In the control, 16.5% of the NSC was from sugar, while, in the untreated and treated whey diets, the sugar percentages were 22.2 and 24.0, respectively, which represents large proportional changes from starch to sugar. This normally would be expected to increase the rate and extent of carbohydrate fermentation. In other studies, however, untreated lactose has not been shown to be rapidly or completely fermented in the rumen. The post-feeding pH in the current study supported this observation, in that the pH for the untreated whey was significantly higher than that of the control, while the treated whey diet resulted in a pH similar to the control.

This suggests the carbohydrates in the untreated whey diet were either less rapidly or less completely fermented than those of the treated whey diet. It is not known if the higher fermentability of the treated whey diet was confined to the sugar fraction or included parts of the starch fraction as well.

The efficiency data in Table 7 shows a large increase in microbial N produced/kg of carbohydrate digested on the treated whey diet. Exactly what caused the change in efficiency is not known. It may be related to the type of carbohydrate fermented or the rates of fermentation. Increases in efficiency also have been related to the protein fractions, especially specific peptides. Although the protein content is not high, peptide analysis of the whey products may be of value.

Conclusions: (1) Compared to the control, both whey diets decreased digestion of ADF and tended to increase digestion of NSC. (2) The treated whey diet significantly increased digestion of OM and CP. (3) The declines in pH after feeding were significantly greater for the control and treated whey diet than for the untreated whey diet. (4) Production of total VFA was not affected by the experimental diets, but production of acetate was reduced slightly by both whey diets. (5) Microbial growth and efficiency were significantly higher for the treated whey diet than for the control or untreated whey diet.

What is claimed is:

1. A method of utilizing a condensed whey permeate ("CWP") to feed a ruminant animal, the method comprising the steps of:
  a. obtaining a CWP that:
    i. has a total solids content in the range of about 20% to about 50% by weight and has a water content in the range of about 80% to about 50% by weight;
    ii. has a lactose concentration of at least 70% by weight of the total solids content; and
    iii. is at a pH of less than 8;
  b. treating the CWP with at least a sufficient proportion of alkali by weight of lactose to raise the pH to at least 8; and
  c. mixing the treated CWP with an animal feed ingredient.

2. The method according to claim 1, wherein the step of obtaining a CWP further comprises obtaining a CWP that does not exhibit substantial crystallization.

3. A method of utilizing a condensed whey permeate ("CWP") to feed a ruminant animal, the method comprising the steps of:
  a. obtaining a CWP that:
    i. has a total solids content in the range of about 20% to about 50% by weight and has a water content in the range of about 80% to about 50% by weight;
    ii. has a lactose concentration of at least 70% by weight of the total solids content;
    iii. does not exhibit substantial crystallization; and
    iv. is at a pH of less than 8;
  b. treating the CWP with at least a sufficient proportion of alkali by weight of lactose to:
    i. raise the pH of the treated CWP to at least 8; and
    ii. reduce the amount of crystallization retained on a 30 mesh screen for a sample of the treated CWP relative to a sample of the untreated CWP when tested after storing for 7 days at a temperature range having:
      (a) a lower limit that is at least above 0° C. (32° F.); and
      (b) an upper limit that is at least 28° C. (50° F.) below the sufficient temperature to dissolve at a pH of about 7 an equivalent concentration of lactose in water to the concentration of lactose to water that is in the untreated CWP; and
  c. mixing the treated CWP with an animal feed ingredient.

4. The method according to claim 3, wherein the step of obtaining a CWP further comprises: obtaining a CWP that has a total solids content of at least 30% by weight; and wherein the step of treating the CWP further comprises: treating the CWP with at least a sufficient proportion of alkali by weight of lactose to reduce the amount of crystallization retained on a 30 mesh screen for a sample of the treated CWP relative to a sample of the untreated CWP when tested after storing for 7 days at about 22° C. (72° F.).

5. The method according to any one of claims 2-3, wherein the step of obtaining a CWP further comprises: obtaining a CWP that is at a temperature that is at least as high as the sufficient temperature for a metastable solution of the CWP determined at a pH within the range of about 5 to about 7, but below 150° C. (302° F.).

6. The method according to any one of claims 2-3, wherein the step of obtaining a CWP further comprises: obtaining a CWP that is at a temperature that is at least as high as the sufficient temperature for a stable solution of the CWP determined at a pH within the range of about 5 to about 7, but below 150° C. (302° F.).

7. The method according to any one of claims 2-3, wherein the step of obtaining a CWP further comprises: obtaining a CWP that is at a temperature at least as high as the sufficient temperature to dissolve an equivalent concentration of lactose in water at a pH of about 7, but below 150° C. (302° F.).

8. The method according to any one of claims 2-3, wherein the alkali is selected from the group consisting of: sodium hydroxide, potassium hydroxide, calcium hydroxide, and any combination thereof in any proportion.

9. The method according to any one of claims 2-3, wherein the step of treating the CWP with alkali comprises: continuously treating a stream of the CWP with alkali.

10. The method according to any one of claims 2-3, further comprising the step of: storing the treated CWP at a temperature range having an upper limit that is at least 28° C. (50° F.) below the sufficient temperature for a stable solution of the CWP determined at a pH within the range of about 5 to about 7.

11. The method according to any one of claims 2-3, further comprising the step of: storing the treated CWP at a temperature range having an upper limit that is at least 28° C. (50° F.) below the sufficient temperature to dissolve an equivalent concentration of lactose in water at a pH of about 7.

12. The method according to any one of claims 2-3, wherein the step of mixing comprises: spraying the treated condensed whey permeate onto the animal feed ingredient.

13. The method according to any one of claims 2-3, further comprises the step of: reducing water content in the mixture of the treated CWP and the animal feed ingredient.

14. The method according to any one of claim 13, wherein the step of reducing water content in the mixture comprises: reducing water content of the mixture to less than or equal to about 10 wt %.

15. The method according to any one of claims 2-3, wherein the mixture is baled up for use as an animal feed or animal feed ingredient.

16. The method according to any one of claims 2-3, further comprising the step of allowing the mixture to ensile.

17. The method according to any one of claims 2-3, further comprising the step of: transporting the treated CWP to an animal feed lot prior to the step of mixing the treated CWP with an animal feed ingredient.

18. The method according to any one of claims 1-3, wherein the step of: obtaining a CWP comprises obtaining a CWP with between about 30% by weight to about 50% by weight total solids content.

19. The method according to any one of claims 1-3, further comprising the step of: feeding the animal feed ingredient with the treated CWP to a ruminant animal.

* * * * *